United States Patent
Hamaue

Patent Number: 5,451,008
Date of Patent: Sep. 19, 1995

[54] PRETENSIONER FOR SEATBELT SYSTEM

[75] Inventor: Tetsuya Hamaue, Shiga, Japan

[73] Assignee: Takata Corporation, Tokyo, Japan

[21] Appl. No.: 88,858

[22] Filed: Jul. 7, 1993

[30] Foreign Application Priority Data

Jul. 8, 1992 [JP] Japan .................. 4-203250

[51] Int. Cl.⁶ .................................................. B60R 22/46
[52] U.S. Cl. ...................................................... 242/374
[58] Field of Search ......... 242/107, 107.4 R, 107.4 A, 242/107.4 B, 374; 280/806; 297/478, 480

[56] References Cited

U.S. PATENT DOCUMENTS

4,423,846 1/1984 Fohl .................................... 242/107
4,558,832 12/1985 Nilsson ............................. 242/107

FOREIGN PATENT DOCUMENTS

2180734 4/1987 United Kingdom .
2205223 12/1988 United Kingdom .

Primary Examiner—John M. Jillions
Attorney, Agent, or Firm—Brumbaugh, Graves, Donohue & Raymond

[57] ABSTRACT

A pretensioner designed to wind tight a belt of a seatbelt system by transmitting power from a power source to a belt take-up element through a clutch mechanism. The clutch mechanism has a driving rotary member connected to the power source, a driven rotary member connected to the belt take-up element, and an engagement member interposed between the two members. The engagement member is brought into engagement with the driving and driven rotary members by a rotational phase difference between the driving and driven rotary members to transmit rotational power from the driving rotary member to the driven rotary member. A follower rotary member provided with rotational resistance is disposed in between the driving rotary member and the driven rotary member. Recesses are respectively formed on the driving rotary member and the follower rotary member to define a space for accommodating the engagement member. The engagement member is retained in the recesses so that the engagement member can be pushed out toward the driven rotary member by contraction of the accommodating space which is caused by a rotational phase difference between the driving rotary member and the follower rotary member.

5 Claims, 6 Drawing Sheets

PRETENSIONER FOR SEATBELT SYSTEM

BACKGROUND OF THE INVENTION

The present invention relates to a pretensioner for straining a belt of a seatbelt system when an emergency occurs. More particularly, the present invention relates to a clutch mechanism used for such a pretensioner.

Vehicles, for example, automobiles, are provided with a seatbelt system which is designed to restrain the occupant's body to the seat. It has been proposed to attach a pretensioner to the seatbelt system as a means for sensing excessive acceleration that acts on the vehicle when an emergency situation, e.g., a collision, occurs, and for straining the belt which has been loosely fastened to the occupant's body, thereby enhancing the restraining effect. Pretensioners are disposed at various parts of the seatbelt system and generally arranged to wind the belt tight, to pull down the buckle, to pull the intermediate portion of the belt, etc., on the basis of the operation of a power source with an acceleration sensor used as a sensing means. Among them, the pretensioner that is designed to wind the belt tight is generally disposed in association with the retractor.

Incidentally, when it is in an inoperative state, the pretensioner that is attached to the retractor must be mechanically disengaged from the belt take-up shaft so as not to prevent the belt unwinding and rewinding operation of the retractor. Accordingly, a clutch mechanism is interposed between the driving element of the pretensioner and the belt take-up shaft.

A conventional clutch mechanism of this type has a driving rotary member and a driven rotary member, which are disengaged from each other. When the pretensioner is activated, an engagement member is wedged into a wedge-shaped space defined between the driving and driven rotary members by using a phase difference in the direction of rotation of these rotary members, thereby connecting the two rotary members. A typical example of this type of clutch mechanism is disclosed in Japanese Patent Application Laid-Open (KOKAI) No. 58-195571 (see the specification of U.S. Pat. No. 4,558,832).

However, in the conventional clutch mechanism having the above-described arrangement, the operation of wedging the engagement member into the wedge-shaped space mainly depends on the sliding frictional resistance occurring between the engagement member and the driven rotary member. It is not always easy to ensure the frictional resistance and secure the reliability of clutch engagement.

On the other hand, the conventional arrangement necessitates the engagement member to be temporarily locked to a stationary element, that is, the pretensioner housing or the like. Therefore, when the pretensioner is activated, the engagement member may be brought into an unstable position by the operation of canceling the temporarily lock, e.g., cutting, which may obstruct a smooth wedging action.

SUMMARY OF THE INVENTION

The present invention has been made in view of the above-described circumstances, and it is an object of the present invention to provide a pretensioner wherein the operation of the clutch mechanism is made even more reliable by interposing in the clutch mechanism a follower rotary member by which the engagement member is positively guided from a retained position in an inoperative state to an engaging action while keeping a stable posture.

To attain the above-described object, the present invention provides a pretensioner designed to wind tight a belt of a seatbelt system by transmitting power from a power source to a belt take-up element through a clutch mechanism. The clutch mechanism has a driving rotary member connected to the power source, a driven rotary member connected to the belt take-up element, and an engagement member interposed between the two members. The engagement member is brought into engagement with the driving and driven rotary members by a rotational phase difference between the driving and driven rotary members to transmit rotational power from the driving rotary member to the driven rotary member. A follower rotary member provided with rotational resistance is disposed in between the driving rotary member and the driven rotary member. Recesses are respectively formed on the driving rotary member and the follower rotary member to define a space for accommodating the engagement member. The engagement member is retained in the recesses so that the engagement member can be pushed out toward the driven rotary member by contraction of the accommodating space which is caused by a rotational phase difference between the driving rotary member and the follower rotary member.

According to the present invention having the above-described arrangement, when the pretensioner is in an inoperative state, the engagement member is retained by being accommodated in the recesses of the driving rotary member and the follower rotary member. When the pretensioner is activated, the driving rotary member, which is connected to the power source, first begins to rotate, and the engagement member also begins to rotate in the same direction together with the driving rotary member. However, the follower rotary member maintains the stationary state without receiving driving force from the driving rotary member. Accordingly, the phase difference between the driving rotary member, which has already begun to rotate, and the follower rotary member, which maintains the stationary state, increases. Thus, the engagement member accommodating space, which extends over the driving rotary member and the follower rotary member, begins to contract. Consequently, the engagement member is pushed out toward the driven rotary member and eventually comes in engagement with the driven rotary member. Thus, the driving and driven rotary members are connected through the engagement member, and the driving force from the power source is transmitted to the belt take-up shaft to wind the belt tight.

According to the present invention, the follower rotary member is disposed in the clutch mechanism to retain the engagement member by the driving rotary member and the follower rotary member, and when the pretensioner is activated, the engagement member can be brought into engagement with the driven rotary member while being guided along the cam surface by the load derived from the delay in rotation of the follower rotary member. Therefore, the shift of the engagement member from the supported state to the engaging action can be effected smoothly and reliably. Accordingly, it is possible to provide a pretensioner which is ensured a reliable operation of the clutch mechanism.

DETAILED DESCRIPTION OF THE PREFERRED EMBODIMENTS

Figure 1:
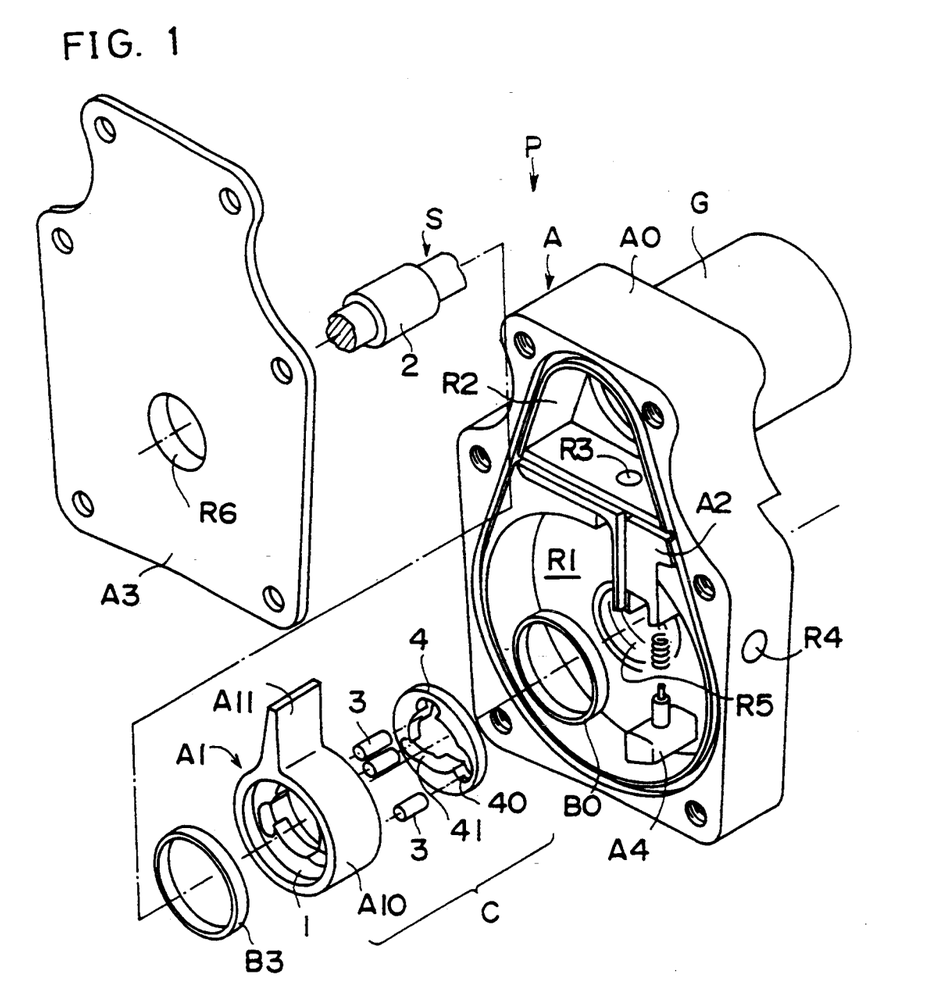
FIG. 1 is an exploded perspective view of a rotary pretensioner according to a first embodiment of the present invention.

Embodiments of the present invention will be described below with reference to the accompanying drawings. FIGS. 1 to 7 show a first embodiment of the pretensioner according to the present invention. First, the arrangement of this embodiment will be outlined with reference to FIGS. 1 and 2. As shown in FIG. 1, the pretensioner P includes as a power source a rotary actuator A provided with a gas generator G and has a clutch mechanism C incorporated therein. The clutch mechanism C has a driving rotary member 1 connected to (in this embodiment, integrated with) a piston rotor A1 of the rotary actuator A, a driven rotary member (drum 2) connected to a belt take-up element (in this embodiment, a take-up shaft S) of a retractor (not shown), and an engagement member (three roller pins 3) interposed between the two members. The clutch mechanism C is arranged such that the roller pins 3 are wedged into respective wedge-shaped spaces defined between the driving rotary member 1 and the drum 2 in response to the rotational phase difference between the driving rotary member 1 and the drum 2, thereby transmitting the rotational power from the driving rotary member 1 to the drum 2. Between the driving rotary member 1 and the drum 2 is disposed a follower rotary member (a clutch plate 4) provided with rotational resistance, which characterizes the present invention.

Figure 2:
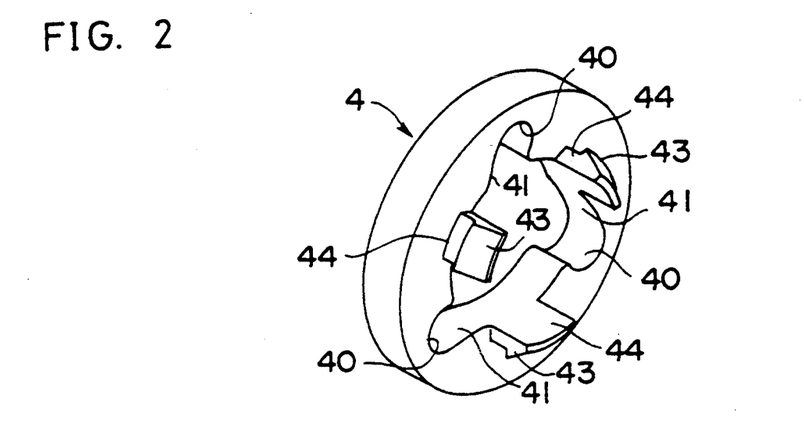
FIG. 2 is an enlarged perspective view of a clutch plate in the first embodiment.

As shown in the enlarged view of FIG. 2, the clutch plate 4 has a ring-shaped configuration and is formed on the inner peripheral side thereof with three recesses 40 for accommodating and retaining the roller pins 3 in cooperation with the driving rotary member 1. A surface 41 of each recess 40, which faces backward as viewed in the direction of rotation of the clutch plate 4 (in this specification, this surface is referred to as "backward surface", and the surface that faces opposite to the backward surface is referred to as "forward surface"), constitutes a cam surface that guides the roller pin 3 toward the drum 2.

Referring back to FIG. 1, the general arrangement of the pretensioner P will be outlined. The rotary actuator A includes a cylinder formed from a pretensioner housing, and a piston rotor A1. The cylinder includes a body A0, a partition block A2, and a lid A3. The body A0 is formed with a circular cylindrical cylinder chamber R1, and an arched preliminary chamber R2 which is adjacent to the cylinder chamber R1 with the partition block A2 interposed therebetween. The preliminary chamber R2 and the cylinder chamber R1 are communicated with each other through a communicating hole R3. The cylinder chamber R1 is opened to the atmosphere through an exhaust opening R4. The body A0 and the lid A3 are formed with respective take-up shaft receiving holes R5 and R6, which are coaxial with the circular cylindrical cylinder chamber R1.

The piston rotor A1 includes a ring portion A10 and a vane A11. The ring portion A10 defines inside the cylinder chamber R1 a clutch mechanism installation space surrounding the outer periphery of the drum 2 and also constitutes a portion through which the piston rotor A1 is rotatably supported in the cylinder. The vane A11 constitutes a pressure-receiving portion extending radially from the ring portion A10. It should be noted that the partition block A2 is provided with a seal member A4 which is pressed on the ring portion A10 of the piston rotor A1 by a spring load, and the body A0 and the lid A3 are secured to the base of the retractor (not shown) by using screws with a seal member (not shown) interposed between the body A0 and the lid A3. In addition, the driving rotary member 1 is formed on the inner periphery of the ring portion A10. The driving rotary member 1 is integrated with the piston rotor A1, as has been described above. The details of the driving rotary member 1 will be explained later.

Figure 3:
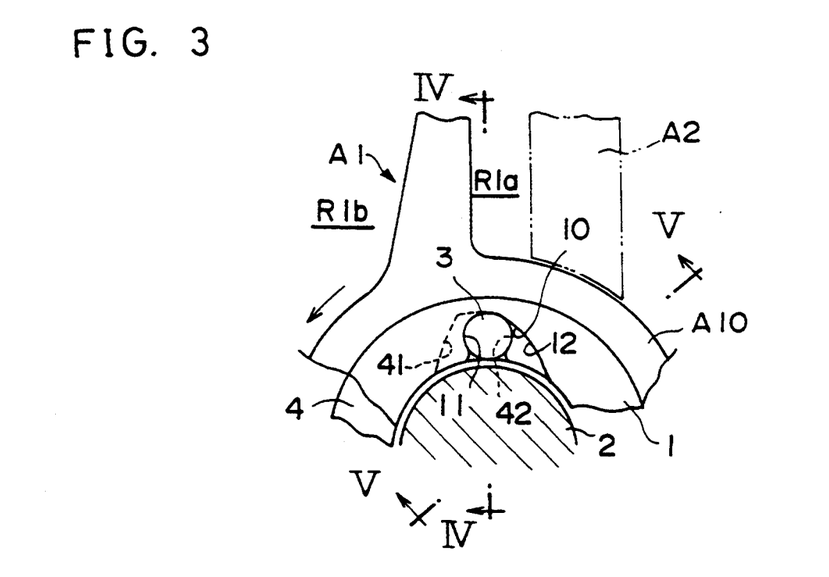
FIG. 3 is a front view of a part of a clutch mechanism in the first embodiment.

Next, the clutch mechanism C will be explained in detail with reference to FIGS. 3 to 5. The driving rotary member 1, which is integrated with the piston rotor A1, is an annular member projecting inwardly from the ring portion A10. The inner peripheral surface of the driving rotary member 1 is formed with three recesses 10 (only one of them is shown in FIG. 3) which are circumferentially spaced at equal pitches. The backward surface of each recess 10 is a cylindrical surface 11 having a curvature equivalent to the outer diameter of the roller pin 3 so as to engage with an approximate half of the peripheral surface of the roller pin 3. The forward surface is an arcuate cam surface 12 having a larger curvature than that of the backward surface.

In contrast, the forward surface of each recess 40 of the clutch plate 4 is a cylindrical surface 42 having a curvature equivalent to the outer diameter of the roller pin 3 so as to engage with an approximate half of the peripheral surface of the roller pin, and the backward surface of the recess 40 is an arcuate cam surface 41 (shown by the chain line in FIG. 3) having a larger curvature than that of the forward surface. Further, three axially extending friction engagement members 44 are provided on the inner periphery of the clutch plate 4 at respective positions between the recesses 40 circumferentially adjacent to each other (see FIG. 2). These friction engagement members 44 are endowed with proper elasticity so that they can fit to the inner periphery of the shaft receiving hole R5 formed in the body A0 to support the clutch plate 4 by the body A0 with proper frictional force and exhibit proper rotational resistance, as shown in FIG. 5. In addition, each friction engagement member 44 has a fall preventing projection 43 provided at the outer peripheral side thereof.

Figure 4:
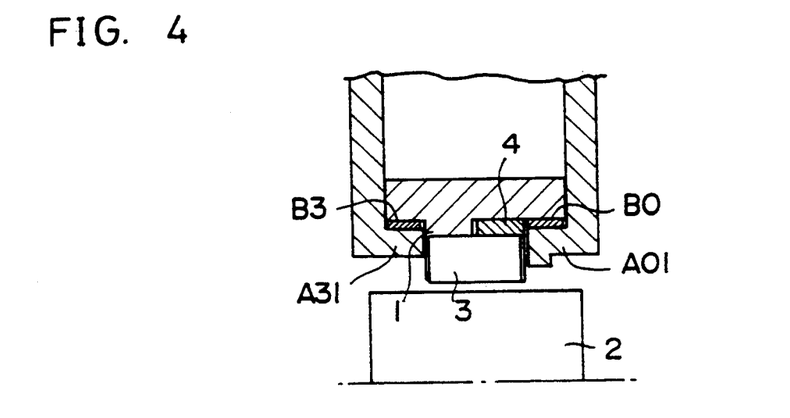
FIG. 4 is a sectional view taken along the line IV—IV in FIG. 3.
Figure 5:
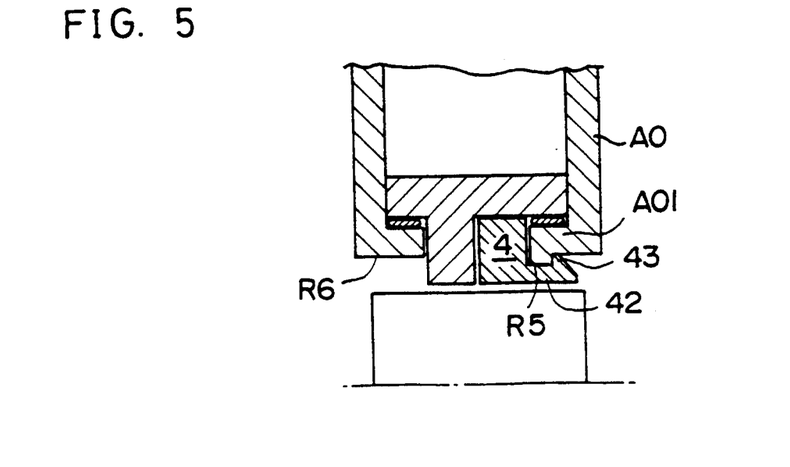
FIG. 5 is a sectional view taken along the line V—V in FIG. 3.

On the other hand, each roller pin 3 is a rigid roller having a length equivalent to the sum of the thickness of the driving rotary member 1 and that of the clutch plate 4, as shown in FIG. 4. The drum 2 is formed from a material softer than the roller pin 3 so that the drum 2 can be slightly deformed to dent when pressed by the roller pin 3.

FIG. 3 shows the clutch mechanism which is in an initial disengaged state. It should be noted that the piston rotor A1 is rotatably supported at both ends thereof by annular flanges A01 and A31, which are projectingly formed to surround the respective shaft receiving holes R5 and R6 of the cylinder body A0 and the lid A3, through a pair of bearing rings B0 and B3. In this position, the roller pin 3 is engaged at a half of the forward surface thereof with the cylindrical surface 11 of the driving rotary member 1, and it is engaged at a half of the backward surface thereof with the cylindrical surface 42 of the clutch plate 4. Accordingly, the roller pin 3 is held in a state wherein it is clamped between the driving rotary member 1 and the clutch plate 4. On the other hand, the clutch plate 4 is supported by the inner peripheral surface of the annular flange A01 by frictional engagement, as shown in FIG. 5.

Next, the operation of the above-described embodiment will be explained. First, when the pretensioner P is in an inoperative state, the piston rotor A1 is temporarily locked to the housing by a shear pin or other temporarily locking means (not shown). Accordingly, the clutch mechanism C is in the state shown in FIG. 3. Thus, the actuator A and the retractor take-up shaft S are disengaged from each other. Accordingly, the retractor functions normally. If excessive acceleration acts on the vehicle, the gas generator G is activated, shown in FIG. 1, in response to a signal from an acceleration sensor (not shown), and the gas generated by the gas generator G is released therefrom to the preliminary chamber R2. Consequently, the pressure in the preliminary chamber R2 rises, and the high-pressure gas is introduced into the pressurizing chamber R1a in the cylinder chamber R1 through the communicating hole R3. The gas pressure introduced into the pressurizing chamber R1a acts on the rear of the vane A11 of the piston rotor A1 and pushes the vane A11. Consequently, the shear pin or other temporarily locking means is sheared, and the piston rotor A1 is released from the temporarily locked state and begins rotating counterclockwise, as shown by the arrow in FIG. 3.

Figure 6:
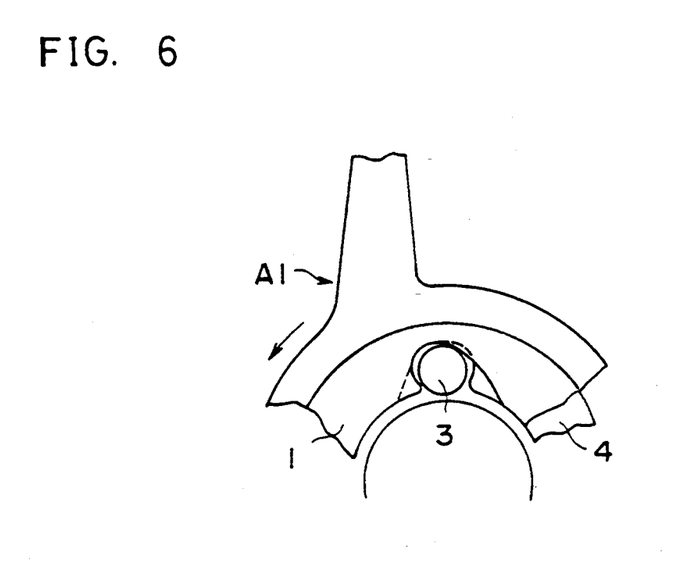
FIG. 6 is a front view showing the initial operation of the clutch mechanism in the first embodiment.

The operation of the piston rotor A1 causes the driving rotary member 1 of the clutch mechanism C to rotate together with the piston rotor A1, as shown in FIG. 6. However, the clutch plate 4 does not rotate. Accordingly, each roller pin accommodating space defined between the driving rotary member 1 and the clutch plate 4 once expands to release the roller pin 3 from the clamped state. When the piston rotor A1 reaches the position shown in FIG. 7 as a result of the rotation thereof, the roller pin accommodating space begins to contract, and the cam surface 12 of the driving rotary member 1 comes in engagement with the rear of the roller pin 3 and pushes it to move in the direction of rotation of the piston rotor A1. As the movement of the roller pin 3 progresses, the forward surface of the roller pin 3 comes in contact with the cam surface 41 of the clutch plate 4 which is in a stationary state. At this time, since slight frictional force is acting on the clutch plate 4 so as to prevent rotation thereof, the roller pin 3 is pushed out toward the drum 2 by counterforce and brought into engagement with the peripheral surface of the drum 2. The engaging action taking place thereafter is mainly performed by the wedging action of the roller pin 3 into a wedge-shaped space formed between the peripheral surface of the drum 2 and the cam surface 12 of the driving rotary member 1. The wedging force causes the roller pin 3 to bite into the peripheral surface of the drum 3. Thus, the driving rotary member 1 and the drum 2 are completely engaged with each other through the roller pins 3.

Figure 7:
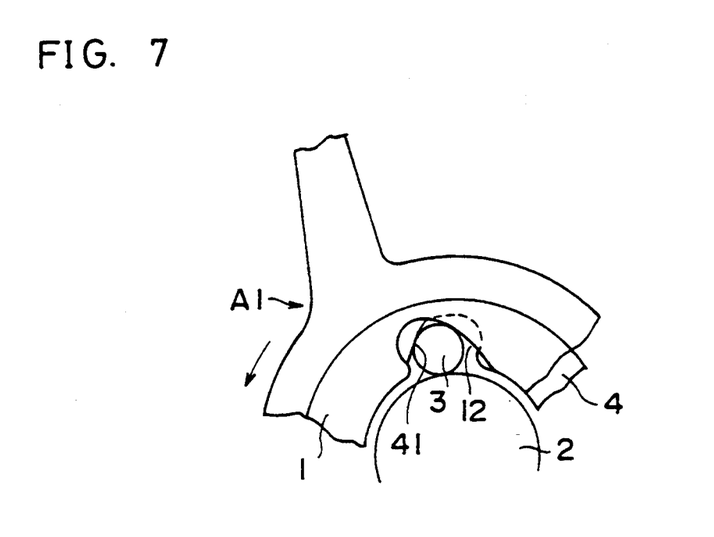
FIG. 7 is a front view showing the engaging operation of the clutch mechanism in the first embodiment.

After the engagement state has been established, the clutch plate 4 is also dragged by the driving rotary member 1 through the roller pins 3 and begins to rotate while applying slight force to the roller pins 3 in the direction for engagement with the drum 2. The back-pressure that is generated by the rotation of the piston rotor A1 is released into the atmosphere through the exhaust opening R4 formed in the body A0. Thus, it is possible to prevent occurrence of resistance due to a rise in the pressure in the back-pressure chamber R1b. In this way, the rotational force of the piston rotor A1 is transmitted to the take-up shaft S.

According to this embodiment, when the pretensioner P is in an inoperative state, the roller pins 3 are supported by being clamped between the driving rotary member 1 and the clutch plate 4, and as the driving rotary member 1 rotates, the roller pins 3 are automatically released from the clamped state. Accordingly, it is possible to eliminate the need for providing a special member for stationarily retaining the roller pins 3. In addition, the shift to the engaging action can be effected extremely smoothly without the need for cutting a retaining member. During the wedging action of the roller pins 3, the roller pins 3 are loaded with force in the wedging direction between the driving rotary member 1 and the drum 2 by virtue of the rotational resistance of the clutch plate 4. Therefore, an even more reliable wedging action is ensured. In addition, the clutch mechanism C is disposed inside the piston rotor A1 with the ring portion A10 interposed between the same and the cylinder chamber R1, so that the working gas introduced into the pressurizing chamber R1a can be prevented from leaking to the clutch mechanism C by the ring portion A10. Accordingly, the gas generator capacity can be reduced. Further, since the clutch mechanism C is incorporated into the pretensioner housing, it is possible to minimize an increase in the axial dimension of the retractor, including the pretensioner P.

Next, a second embodiment of the present invention will be explained with reference to FIGS. 8 to 13. In this embodiment, the arrangement of the clutch mechanism C in the above-described first embodiment is partly changed. Therefore, the second embodiment is essentially similar to the first embodiment. The two embodiments are different from each other mainly in the arrangement of the engagement member and the driven rotary member. Accordingly, elements or portions of the second embodiment which are similar to those of the first embodiment are denoted by the same reference numerals (however, A is suffixed to the reference numerals of elements or portions which are different in the details from those of the first embodiment), and description thereof is omitted. Only points in which the second embodiment differs from the first embodiment will be explained below in detail.

Figure 8:
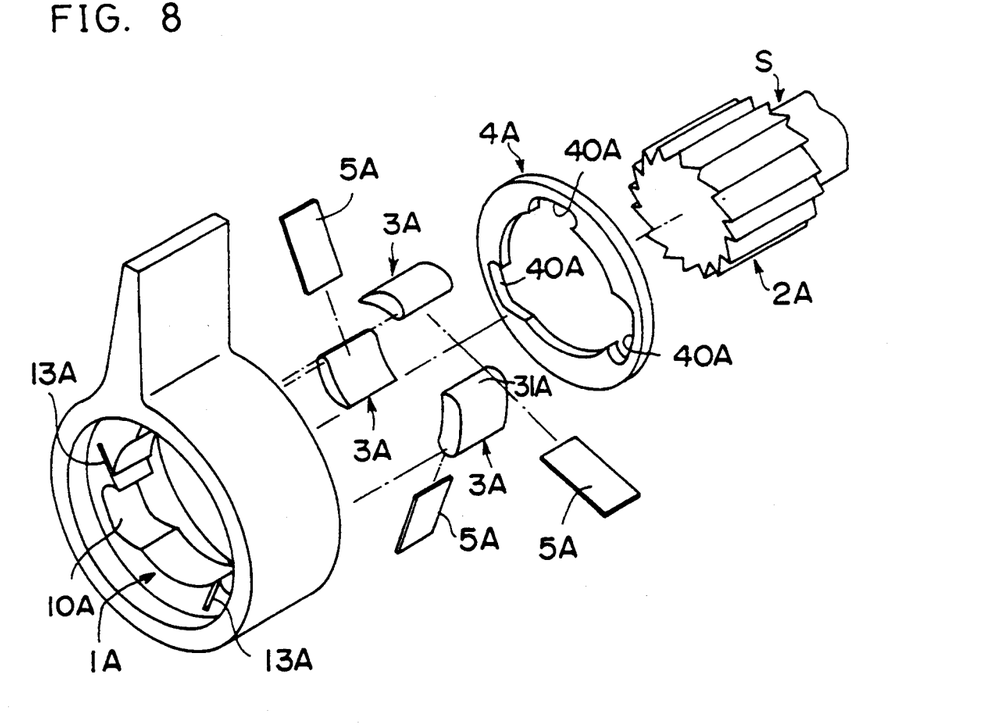
FIG. 8 is an enlarged exploded perspective view of a clutch mechanism of a rotary pretensioner according to a second embodiment of the present invention.
Figure 9:
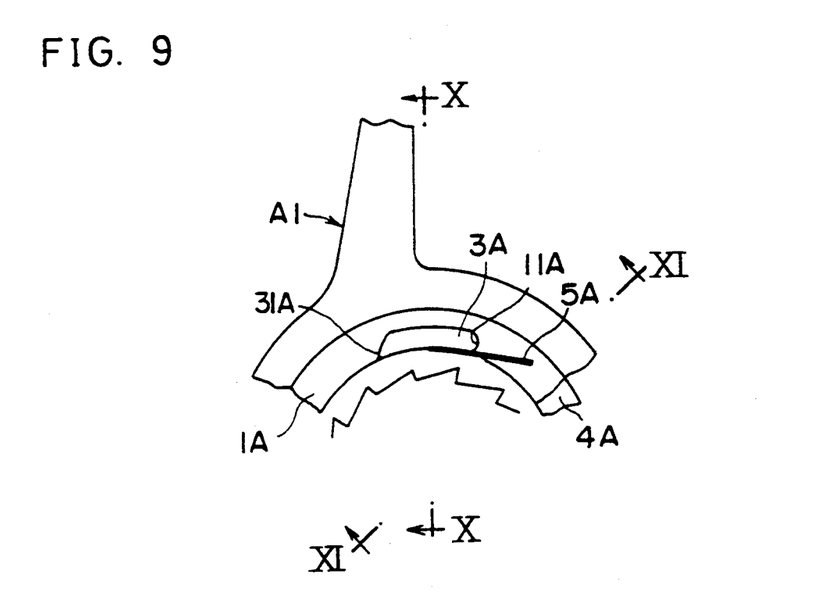
FIG. 9 is a front view of a part of the clutch mechanism in the second embodiment.

First, as shown in FIGS. 8 and 9, the driving rotary member 1A is formed on the inner peripheral side thereof with three recesses 10A which accommodate engagement members (in this embodiment, three key plates 3A), respectively, and which rotatably engage the respective backward surfaces of the engagement members. The recesses 10A have a cross-sectional configuration which is approximately coincident with that of the key plates 3A. In addition, a spring retaining groove 13A is formed adjacent to the rear edge of each recess 10A.

The driven rotary member is a ratchet wheel 2A which has one-way engagement teeth on the outer periphery thereof in opposing relation to the key plates 3A and which is nonrotatably secured to the take-up shaft S. The follower rotary member in this embodiment is an inertia plate 4A having relatively large mass so as to exhibit rotational resistance by inertial mass. The inertia plate 4A is formed on the inner peripheral side thereof with three recesses 40A having a similar cross-sectional configuration to that of the recesses 10A. The key plates 3A are formed as arcuate members having a width sufficient for them to extend over the driving rotary member 1A and the inertia plate 4A. The distal end of the forward surface of each key plate 3A is sharpened so as to engage with a one-way engagement tooth of the ratchet wheel 2A. The forward surface that is contiguous with the sharpened end is defined as a cam surface 31A which cooperates with the backward surface of a recess 40A. The backward surface of the key plate 3A is a cylindrical surface so that an approximate half of the backward surface is rotatably engaged with a recess 10A.

Figure 10:
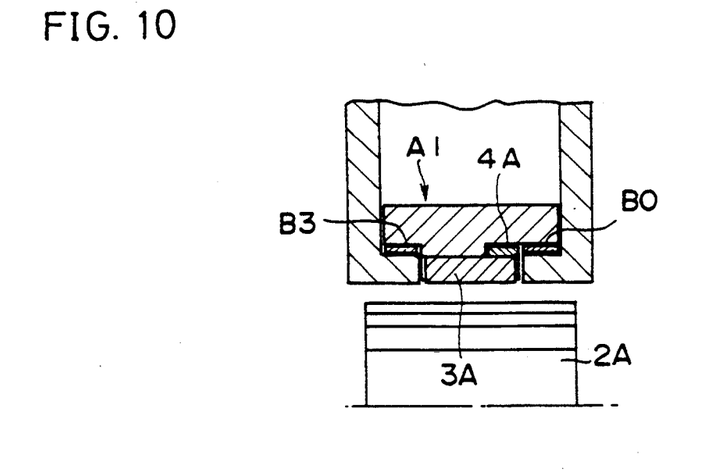
FIG. 10 is a sectional view taken along the line X—X in FIG. 9.
Figure 11:
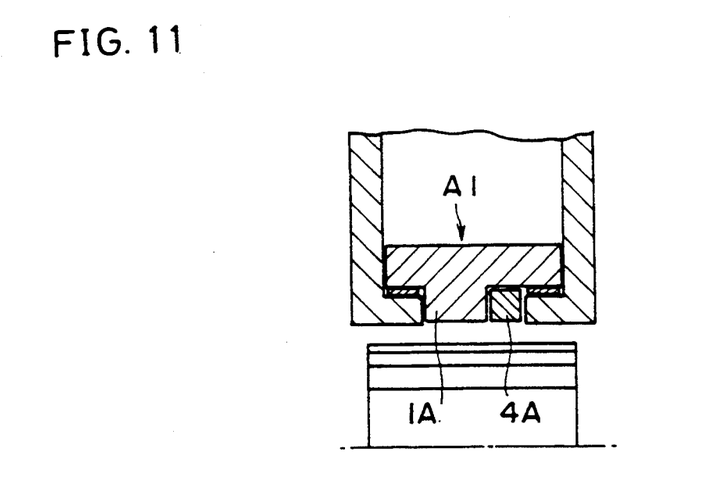
FIG. 11 is a sectional view taken along the line XI—XI in FIG. 9.

FIG. 9 to 11 show the above-described clutch mechanism which is in an initial disengaged state. In this position, each key plate 3A is engaged at the cylindrical backward surface thereof with the cylindrical surface 11A of the driving rotary member 1A and outwardly biased by the load applied by the leaf spring 5A fitted in the spring retaining groove 13A. In this way, the key plate 3A is received in the recesses 10A and 40A of the driving rotary member 1A and the inertia plate 4A.

Figure 12:
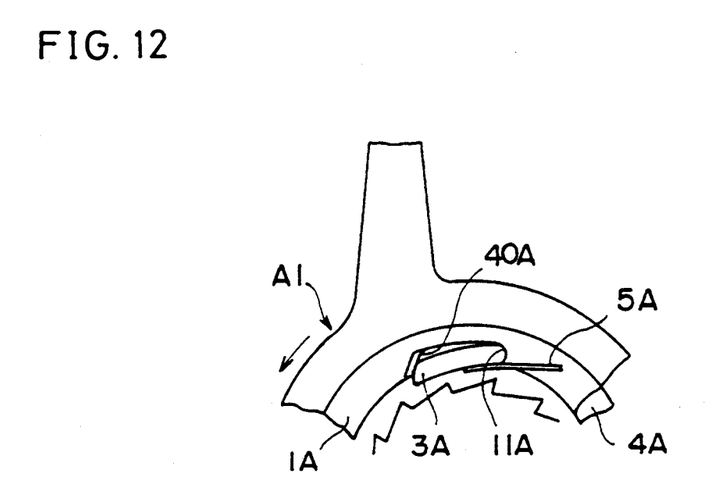
FIG. 12 is a front view showing the initial operation of the clutch mechanism in the second embodiment.

Next, the operation of the above-described embodiment will be explained. In this embodiment, when the piston rotor A1 begins to rotate, the driving rotary member 1A of the clutch mechanism rotates together with the piston rotor A1, as shown in FIG. 12. However, the inertia plate 4A does not rotate but maintains the initial position. Accordingly, the distal end of each key plate 3A is pushed out from the recess 40A of the inertia plate 4A, and the key plate 3A begins to rotate inwardly against the load from the spring 5A while being retained by the cylindrical surface 11A. Thereafter, the cam surface 31A of the key plate 3A is pushed by the corner of the recess 40A, causing the key plate 3A to rotate furthermore.

Figure 13:
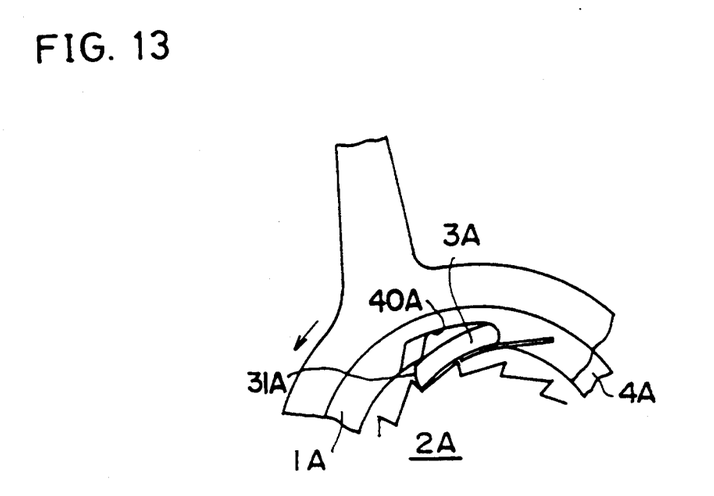
FIG. 13 is a front view showing the engaging operation of the clutch mechanism in the second embodiment.

As this movement progresses, the distal end of the key plate 3A eventually enters the area between two one-way engagement teeth of the ratchet wheel 2A, which is in a stationary state, and comes into contact with one tooth face, as shown in FIG. 13. After this engagement state has been established, the inertia plate 4A is also dragged by the key plates 3A and rotates together therewith while applying slight force to the key plates 3A in the direction for engagement with the ratchet wheel 2A. In this way, the rotational force of the piston rotor A1 is transmitted to the take-up shaft S.

According to this embodiment, the key plates 3A are retained by the driving rotary member 1 irrespective of whether the pretensioner is in an operative or inoperative state. Accordingly, the shift of the key plates 3A to the engaging action can be effected extremely smoothly without the need for cutting a retaining member. When the key plates 3A come in mesh with the ratchet wheel 2A, the key plates 3A are constantly loaded with force in the direction for meshing by virtue of the inertial rotational resistance of the inertia plate 4A. Therefore, a reliable meshing operation is ensured. In this embodiment also, the clutch mechanism is disposed inside the rotary actuator A and incorporated in the pretensioner housing in an isolate state. Therefore, gas leakage can be effectively prevented. Accordingly, the gas generator capacity can be reduced, and it is possible to realize a reduction in the overall size of the pretensioner.

Although the present invention has been described above in detail by way of two embodiments, it should be noted that the present invention is not necessarily limited to the described embodiments and that various changes and modifications may be imparted to the specific arrangement of each part of the embodiments without departing from the scope of the invention which is limited solely by the appended claim. For example, the follower rotary member in the first embodiment may be an inertia member. Alternatively, the follower rotary member in the second embodiment may be provided with friction engagement projections. With regard to the engagement member, although three engagement members are employed in both the embodiments because it is a preferable number among a plurality of engagement members, the number of engagement members may be one or other desired number. Particularly, the circumferential pitch of the key plates in the second embodiment is preferably made irregular with a view to preventing meshing failure due to collision of the tip or other accident. In this case, each key plate must be made sufficiently strong to ensure transmission of the driving torque by a single key plate, as a matter of course.

What is claimed is:

1. A vehicle seat belt pretensioner comprising a driving rotary member, a power source for imparting driving rotation to the driving rotary member, a driven rotary member connected to a belt take-up element, the driving rotary member and driven rotary member being rotatable about a common axis, and clutch means interposed between the driving rotary member and the driven rotary member for transmitting rotational power from the rotary driving member to the driven rotary member and engageable by a rotational phase difference between the driving rotary member and the driven rotary member, the clutch means including a follower rotary member having a rotational resistance and having a portion disposed axially adjacent a portion of the driving rotary member, recesses in the axially overlapping portions of the driving rotary member and the follower rotary member, the recesses partially overlapping axially of the pretensioner, and an engagement member received partly in the recess in the driving rotary member and partly in the recess in the follower rotary member, and the recesses in the driving rotary member and the follower rotary member having surfaces that engage portions of the engagement member generally opposite each other circumferentially to push the engagement member out of the recesses by circumferential contraction of the overlapping portions of the recesses upon rotation of the driving rotary member relative to the follower rotary member as a result of retardation of the rotation of the follower rotary member.

2. A pretensioner according to claim 1 wherein the power source is a rotary actuator, the driving rotary member is a rotor of the rotary actuator.

3. A pretensioner according to claim 1 wherein rotation of the follower rotary member is retarded by friction.

4. A pretensioner according to claim 2 wherein rotation of the follower rotary member is retarded by friction, the follower rotary member having a surface engaging a housing of the rotary actuator.

5. A pretensioner according to claim 1 wherein rotation of the follower rotary member is retarded by inertia.

* * * * *